(12) United States Patent
He

(10) Patent No.: US 8,392,730 B2
(45) Date of Patent: Mar. 5, 2013

(54) CURRENT SHARING METHOD OF DC POWER SUPPLY AND DEVICE THEREOF

(75) Inventor: Chuan He, Shenzhen (CN)

(73) Assignee: ZTE Corporation, Hi-Tech Industrial Park, Nanshan District, Shenzhen, Guangdong Province (CN)

( * ) Notice: Subject to any disclaimer, the term of this patent is extended or adjusted under 35 U.S.C. 154(b) by 0 days.

(21) Appl. No.: 13/500,910

(22) PCT Filed: Sep. 15, 2010

(86) PCT No.: PCT/CN2010/076928
§ 371 (c)(1),
(2), (4) Date: Apr. 8, 2012

(87) PCT Pub. No.: WO2011/044806
PCT Pub. Date: Apr. 21, 2011

(65) Prior Publication Data
US 2012/0204053 A1    Aug. 9, 2012

(30) Foreign Application Priority Data

Oct. 14, 2009  (CN) .......................... 2009 1 0179959

(51) Int. Cl.
*G06F 1/00* (2006.01)
*G06F 13/00* (2006.01)
*G05F 1/577* (2006.01)
*H02M 7/08* (2006.01)
*G01R 19/00* (2006.01)

(52) U.S. Cl. ........................... 713/300; 323/267; 363/69

(58) Field of Classification Search .................. 713/300; 323/267; 363/69; 702/64; 710/100
See application file for complete search history.

(56) References Cited

U.S. PATENT DOCUMENTS

| 7,235,957 | B2 * | 6/2007 | Yang ............................. 323/272 |
| 7,282,899 | B1 | 10/2007 | Daun-Lindberg et al. |
| 7,479,772 | B2 | 1/2009 | Zane et al. |
| 7,772,821 | B2 * | 8/2010 | Liu et al. ....................... 323/283 |
| 8,120,203 | B2 * | 2/2012 | Heineman et al. .............. 307/32 |

FOREIGN PATENT DOCUMENTS

| CN | 1700554 A | 11/2005 |
| CN | 101667729 A | 3/2010 |
| JP | 5-189065 A | 7/1993 |

OTHER PUBLICATIONS

International Search Report for PCT/CN2010/076928 dated Nov. 25, 2010.

* cited by examiner

*Primary Examiner* — Stefan Stoynov
(74) *Attorney, Agent, or Firm* — Ling Wu; Stephen Yang; Ling and Yang Intellectual Property LLC

(57) ABSTRACT

A current sharing method and device for a DC power supply are provided, and the method includes: taking a latest detected bus current as a reference current to perform current sharing control on a local host current; calculating and timing sending time of the local host current according to the latest detected bus current, the local host current, and a preset corresponding relationship between a difference between the local host current and the bus current and the sending time of the local host current, and if no new bus current is detected within a timing time, sending the local host current as a new bus current to a bus when the timing times out. The method has small communication traffic and no master-slave relationship, and is simple to control, which reduces the difficulty of system development and improves the system reliability.

13 Claims, 3 Drawing Sheets

CURRENT SHARING METHOD OF DC POWER SUPPLY AND DEVICE THEREOF

TECHNICAL FIELD

The present invention relates to the telecom power supply technology, and particularly, to a processing method and device for guaranteeing an output load equipartition when a large number of rectifier modules are in parallel connection.

BACKGROUND OF THE RELATED ART

With the development of communication technology, the demand for communication power supply also increases gradually, and a mode of paralleling modules is adopted in the system to adapt to the increase of the power demand and also can implement redundancy of the power module to improve reliability at the same time with the increase of the power. However, to implement a parallel connection of the rectifier power modules, the problem that the rectifier modules share different loads caused by the un-identical parameters of the rectifier module apparatuses must be overcome. The different loads of the rectifier modules make the output current of each module different, and the reliability of the system is reduced since part of the rectifier modules have large loads and some have rather small loads. To solve the problem of load equipartition, it is required to perform current sharing control. The method for implementing current sharing control has an analog mode and a digital mode. Since the rectifier current sharing implemented by the analog mode has disadvantages of low precision resulted from easy to be influenced by circumstance, needing a current sharing bus and limited number of parallel connections and so on, the current sharing solution of the digital mode gradually appears.

Currently, digital implementation for implementing the rectifier current sharing mainly has two types: one is average current method, that is, each rectifier module sends the output current of the local host in the way of communication, and then each rectifier collects the output current of all rectifiers in the system and calculates the average current, which is taken as a reference to perform current sharing control. Another is master-slave method, that is, the system has a master machine, which sends the local host current in the way of communication, and other rectifiers are slave machines, which follow the current of the master machine to reach the purpose of current sharing.

In the average current method, it needs to acquire the output currents of all rectifier modules in the parallel system, and the communication traffic also increases with the increase of the number of parallel connections. If the number of parallel connections is N, the communication traffic is N/2 times, which will cause a huge pressure on the communication and a bottleneck of the increase of the number of parallel connections.

In the master-slave method, only the master machine sends the current, which has no relationship with the number of parallel connections, the number of parallel connections is not limited in theory and is related to the signal attenuation of communication physical paths. However, in this method, because the existence of the master machine, the current sharing will fail when the master machine breaks down. To avoid this problem, a complicated fault detection mechanism for the master machine must be adopted.

SUMMARY OF THE INVENTION

The technical problem required to be solved by the present invention is to provide a current sharing method and device for the DC power supply, and specifically, to provide a current sharing processing scheme for the DC power supply with small communication traffic, no master-slave machines and simple control with respect to the disadvantages that large communication traffic or master machine existence and complicated processing in the digital current sharing mode in the existing technology.

In order to solve the above technical problem, the present invention provides a current sharing method for the DC power supply, and the method comprises:

taking a latest detected bus current as a reference current to perform current sharing control on a local host current; and calculating and timing sending time of the local host current according to the latest detected bus current, the local host current, and a preset corresponding relationship between a difference between the local host current and the bus current and the sending time of the local host current, and if no new bus current is detected within a timing time, sending the local host current as a new bus current to a bus when the timing times out.

Preferably, the above method can be further characterized in that:

the preset corresponding relationship between a difference between the local host current and the bus current and the sending time of the local host current is:

$$\begin{cases} I_e = I_{dc} - I_{bus} \\ T_s = T_r - I_e * K \end{cases}$$

wherein, $I_{dc}$ is the local host current, $I_{bus}$ is the bus current, $I_e$ is the difference between the local host current and the bus current, $T_r$ is a set time period, $T_s$ is the sending time of the local host current, and K is a time factor.

Preferably, the above method can be further characterized in that:

before the step of taking the latest detected bus current as the reference current to perform current sharing control on the local host current, the method further comprises:

the local host current going through sampling processing, Analog-to-Digital (A/D) conversion processing and calibration processing.

Preferably, the above method can be further characterized in that:

timing the sending time of the local host current is: timing the calculated sending time of the local host current based on a synchronization clock.

In order to solve the above technical problem, the present invention provides a current sharing device for the DC power supply, and the current sharing device comprises a DC control module and a bus current management module, wherein:

the DC control module is configured to: take a latest bus current detected by the bus current management module as a reference current to perform current sharing control on a local host current; and the bus current management module is configured to: detect the bus current and a local host current, and calculate and time sending time of the local host current according to the latest detected bus current, the local host current, and a preset corresponding relationship between a difference between the local host current and the bus current and the sending time of the local host current, and if no new bus current is detected within a timing time, send the local host current as a new bus current to a bus when the timing times out.

Preferably, the above method can be further characterized in that: the bus current management module comprises a signal processing unit, a current positioning unit, a timing sending control unit and a communication unit, wherein, the signal processing unit comprises a hardware sampling circuit and an Analog-to-Digital (A/D) conversion circuit, and is configured to perform sampling and A/D conversion processing on signals of DC voltage and DC current output by a local host;

the current positioning unit is configured to: calculate the sending time of the local host current according to the bus current latest detected by the communication unit, the local host current latest detected by the signal processing unit, and the preset corresponding relationship between the difference between the local host current and the bus current and the sending time of the local host current;

the timing sending control unit comprises a timer, and is configured to: time the sending time of the local host current calculated by the current positioning unit, and judge whether the bus current is received from the communication unit within the timing time of the timer, if a result of the judging is "yes", stop and reset the timer; if the result of the judging is "no", acquire the local host current from the current positioning unit and send the local host current to the communication unit when the timer times out;

the communication unit is configured to: acquire the bus current from a communication bus and then send the bus current to the current positioning unit and a DC control unit, and send the local host current sent from the timing sending control unit to the communication bus as the new bus current.

Preferably, the above method can be further characterized in that:
the preset corresponding relationship between the difference between the local host current and the bus current and the sending time of the local host current is:

$$\begin{cases} I_e = I_{dc} - I_{bus} \\ T_s = T_r - I_e * K \end{cases}$$

wherein, $I_{dc}$ is the local host current, $I_{bus}$ is the bus current, $I_e$ is the difference between the local host current and the bus current, $T_r$ is a set time period, $T_s$ is the sending time of the local host current, and K is a time factor.

Preferably, the above method can be further characterized in that:
the signal processing unit is further configured to: perform calibration processing on a voltage signal and a current signal obtained after the A/D conversion processing.

Preferably, the above method can be further characterized in that:
the DC control module comprises a comparator and a rectifier output current control loop (PI), the comparator is configured to: take the bus current latest detected by the communication unit as the reference current to compare with the local host current latest detected by the signal processing unit; and the PI is configured to: perform error control according to a comparison result output by the comparator.

Preferably, the above method can be further characterized in that:
the timing sending control unit is configured to: perform the timing based on a synchronization clock. According to the current sharing method and device for the DC power supply provided by the present invention, and compared with the existing technology, the parallel system only needs to send the output current of one rectifier to achieve the current sharing control. Meanwhile, the system can automatically generate the rectifier which sends the bus current, has no master machine, and dose not need to perform any processing on the fault quit of the master machine, which avoids a performance decline of the current sharing caused by the handover of the master machine and operations such as the master machine competition mechanism related to the master machine. In addition, the current sharing control only needs to acquire the bus current at any time, so the communication traffic is greatly reduced when compared with the communication traffic needed in the mode of needing the current of each rectifier according to the average current method, and the communication traffic will not increase with the increasing of the number of parallel connections, thus making the number of parallel connections not limited by the communication. The current sharing method has both advantages of the low communication traffic of master-slave mode and the simple control of the average mode, which reduces the difficulty of system development and improves the system reliability.

PREFERRED EMBODIMENTS OF THE PRESENT INVENTION

The technical scheme of the present invention will be described in detail in combination with the accompanying drawings below.

Figure 1:
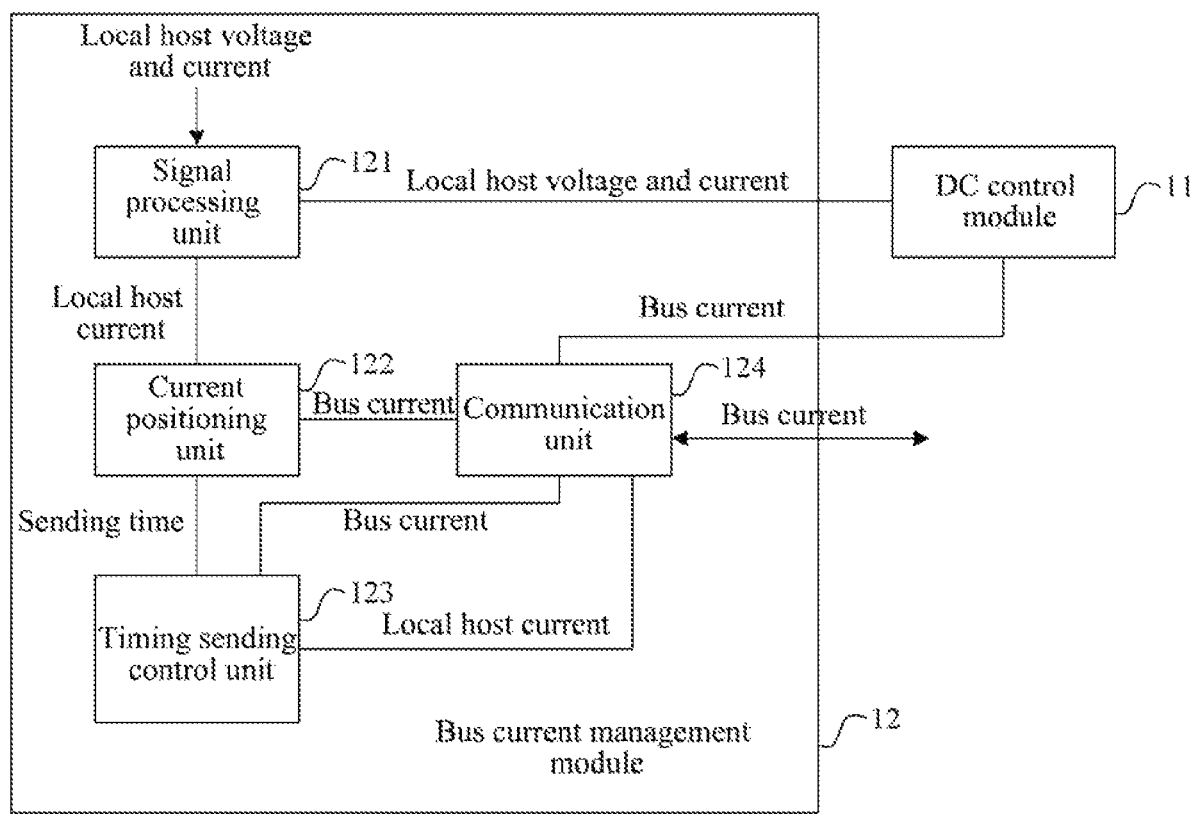
FIG. 1 is a block diagram of a current sharing device for the DC power supply according to the example of the present invention.

With reference to FIG. 1, it illustrates a current sharing device for the DC power supply according to the example of the present invention. The device is respectively located on each rectifier module in parallel connection and used to control the output of the rectifier module on which the device is located, thereby implementing current sharing of each rectifier module in parallel connection, and the device comprises a DC control module 11 and a bus current management module 12, wherein:

the DC control module 11 is configured to: take a latest bus current detected by the bus current management module 12 as a reference current to perform current sharing control on a local host current;

the bus current management module 12 is configured to: detect the bus current and local host current, and calculate the sending time of the local host current and time the sending time of the local host current according to the latest detected bus current, the local host current, and a preset corresponding relationship between the difference between the local host current and the bus current and the sending time of the local host current, and if no new bus current is detected within the timing time, send the local host current to a bus as the new bus current when the timing times out.

Furthermore, the bus current management module 12 is further divided into a signal processing unit 121, a current positioning unit 122, a timing sending control unit 123 and a communication unit 124.

The signal processing unit 121 comprises a hardware sampling circuit and an Analog-to-Digital (A/D) conversion circuit, the hardware sampling circuit is configured to: perform sampling on signals of the DC voltage and DC current output by a local host, and the A/D conversion circuit is configured to: perform A/D conversion processing on sampling signals of the voltage and current output by the hardware sampling circuit. The signal processing unit 121 is further configured to: perform calibration processing on the signals of the voltage and current obtained through the A/D conversion processing. The calibration processing refers to formulating the ranges of integer and decimal of data, thereby performing decimal processing conveniently and improving the control precision.

The current positioning unit 12 is configured to: calculate the sending time of the local host current according to the bus current latest detected by the communication unit 124 and the local host current latest detected by the signal processing unit 121, and the preset corresponding relationship between the difference between the local host current and the bus current and the sending time of the local host current, thereby converting a current signal into a time signal and then sending the calculated sending time of the local host current to the timing sending control unit 123.

The timing sending control unit 123 comprises a timer, and is configured to: start the timer when receiving the sending time of the local host current sent from the current positioning unit 122, wherein the timing time is the sending time of the local host current received by the timing sending control unit 123, and judge whether the bus current is received from the communication unit 124 within the timing time of the timer, if the judging result is yes, stop and reset the timer; otherwise acquire the local host current from the current positioning unit 122 and send the local host current to the communication unit 124 when the timer times out. Preferably, the timing sending control unit 123 is performing the timing on the basis of a synchronization clock.

The communication unit 124 is configured to: acquire the bus current from a communication bus and then send the bus current to the current positioning unit 122 and DC control module 11, and send the current sent from the timing sending control unit 123 to the communication bus as the new bus current.

The DC control module 11 comprises a comparator and a rectifier output current control loop (PI), the comparator takes the bus current latest detected by the communication unit 124 as the reference current to compare with the local host current latest detected by the signal processing unit 121; and the PI performs error control according to a comparison result output by the comparator, to make the local host current track the bus current, thereby reaching the purpose of outputting the current sharing.

Figure 2:
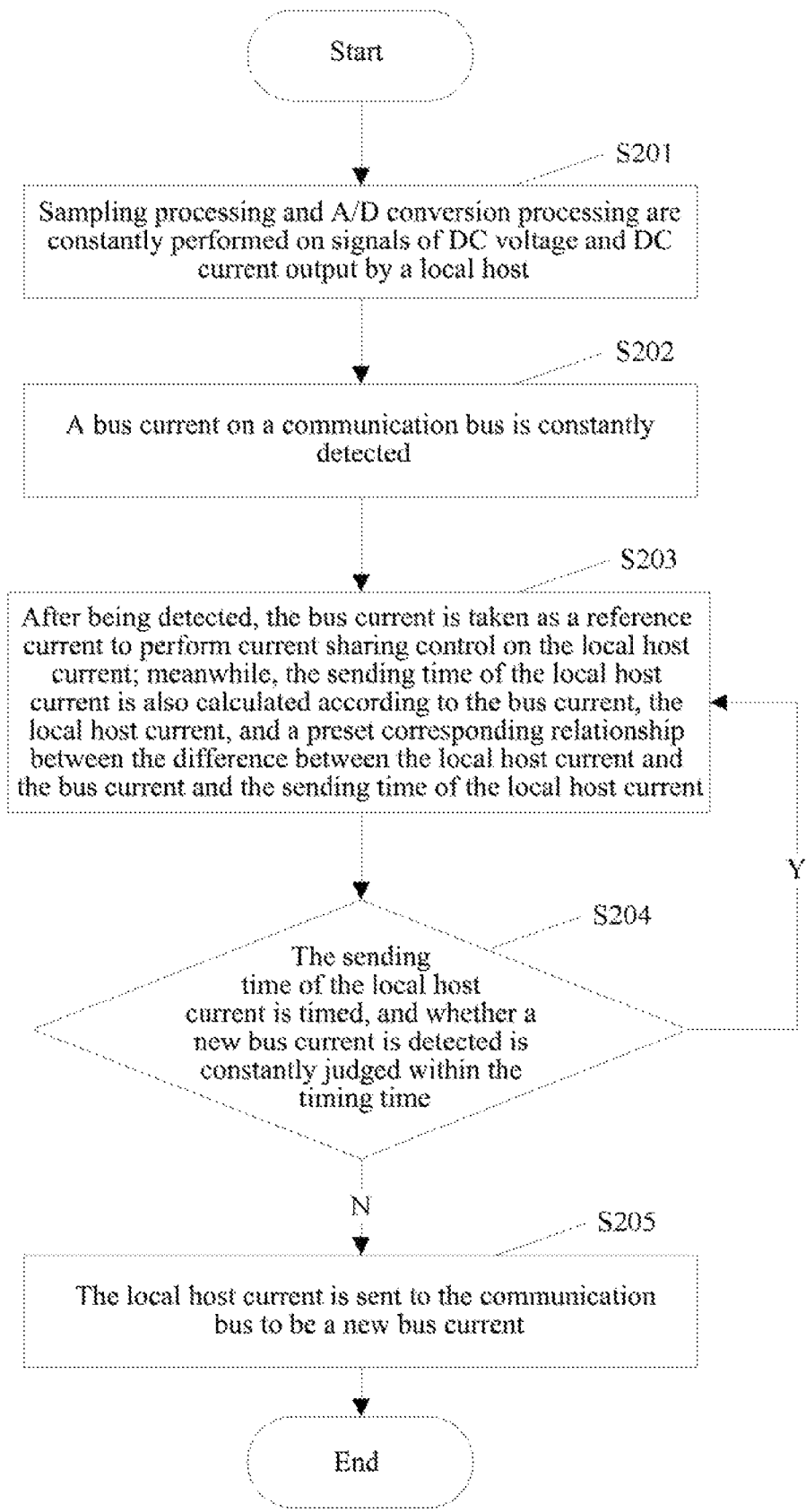
FIG. 2 is a flow chart of a current sharing method for the DC power supply according to the example of the present invention.

With reference to FIG. 2, it illustrates a method using the current sharing device shown in FIG. 1 to perform current sharing according to the example of the present invention, and the following steps are included.

In step S201, the sampling processing and A/D conversion processing are constantly performed on signals of DC voltage and DC current output by a local host.

After the A/D conversion processing is performed on the sampling signals of the voltage and current, the calibration processing also can be performed to determine the ranges of integer and decimal of data, which makes a control system be able to perform decimal processing conveniently and improves control precision.

In step S202, a bus current on a communication bus is constantly detected.

In step S203, after the bus current is detected, the detected bus current is taken as a reference current signal to perform current sharing control on a local host current obtained through the sampling processing and A/D conversion processing; meanwhile, the sending time of the local host current is also calculated according to the detected bus current and local host current which is obtained through the sampling processing and A/D conversion processing, and a preset corresponding relationship between differences between local host current and the bus current and sending times of the local host current.

Figure 3:
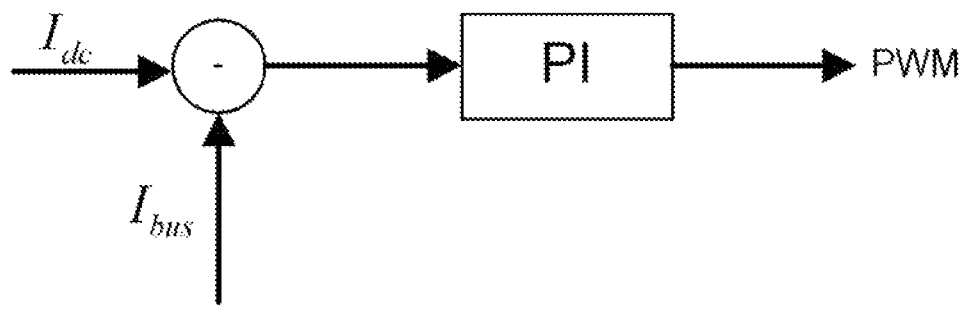
FIG. 3 is a schematic diagram of current sharing control of the DC control unit according to the present invention.

The schematic diagram of taking the detected bus current as the reference current signal to perform current sharing control on the local host current obtained through the sampling processing and A/D conversion processing is as shown in FIG. 3, that is, the present invention takes the bus current which replaces the output of a local host voltage loop in the existing technology as the reference current to implement the current sharing control.

The preset corresponding relationship between the difference between the local host current and the bus current and the sending time of the local host current can be:

$$\begin{cases} I_e = I_{dc} - I_{bus} & \text{(Formula 1)} \\ T_s = T_r - I_e * K & \text{(Formula 2)} \end{cases}$$

wherein, $I_{dc}$ is the local host current, $I_{bus}$ is the bus current, $I_e$ is the difference between the local host current and the bus current, $T_r$ is a set time period, $T_s$ is the sending time of the local host current, and K is a time factor.

The reason why the present invention provides the above formula is that the calculated value of $I_e$ may be positive and also may be negative, while the sending time of the local host current can only be a positive, thus if the factor K is multiplied directly, a numerical value less than zero may appear, but the sending time is impossible to be negative (i.e. advancing). Therefore, a regular time $T_r$ is set, increase and reduction are performed on the basis of $T_r$, which guarantees to obtain a delay time greater than zero.

In addition, the values of $T_r$ and K is set according to a specific scenario. For example, as there is a high requirement for current sharing in some scenarios, where $T_r$ with higher precision and smaller value and K with higher precision can be set, thereby improving the precision of $T_s$.

In step S204, the calculated sending time of the local host current is timed, and whether a new bus current is detected is constantly judged within the timing time, and if a new bus current is detected before the timing time times out, proceed to step S203, otherwise proceed to step S205.

In step S205, when the timing time times out, the local host current is sent to the communication bus as the new bus current, and the flow ends.

According to the present invention, the bus current may be precisely the local host current, but its origin is acquired from the communication bus, thus all rectifiers can be guaranteed to have the same bus current.

Figure 4:
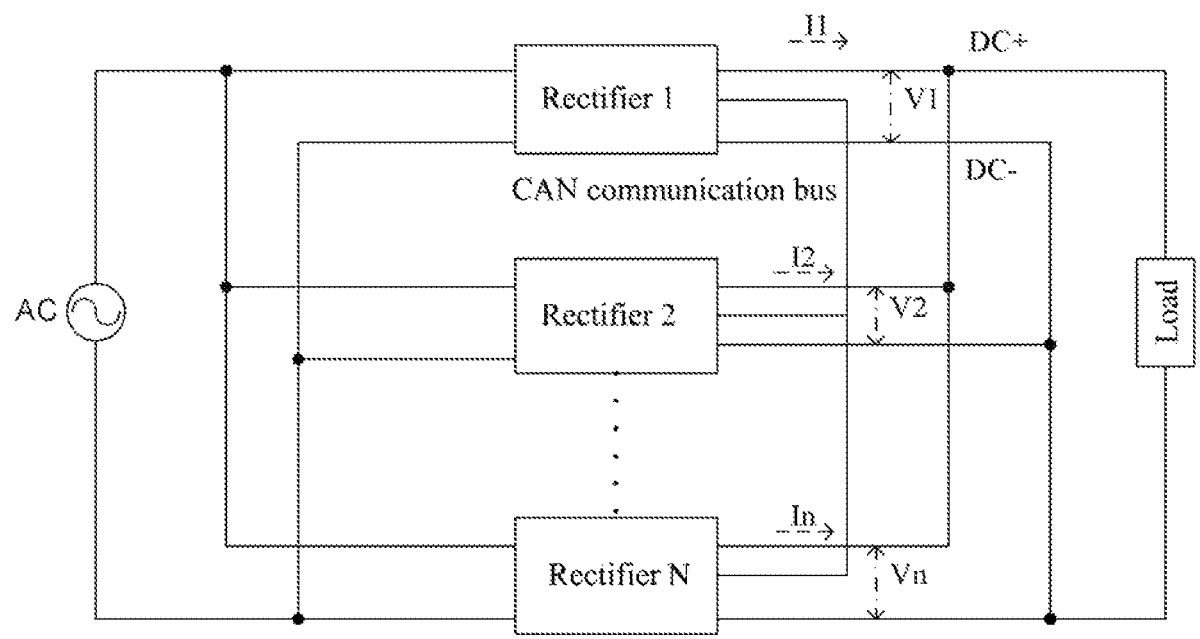
FIG. 4 is a schematic diagram of the rectifier modules in parallel.

With reference to FIG. 4, it is a schematic diagram of the rectifier modules in parallel, wherein, the AC inputs and DC outputs of all the rectifier modules are connected in parallel, and a connection is performed between all the rectifier modules through a communication bus CAN. The current sharing device according to FIG. 1 is installed on each rectifier in parallel connection, and the bus current is taken as the reference current to perform current sharing control on the output of each rectifier. Meanwhile, current information of the rectifiers is subtly converted into sending time information, and the bus current is timely updated according to the output variation of each rectifier in the way of regularly sending the sending time. Each current sharing device controlling the current sharing of each rectifier module in the system can adopt a synchronization clock when timing the sending time, to guarantee a timekeeping precision, thereby ensuring accuracy of the current sharing control. The present invention places no limitation on the method for synchronization.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present invention is not limited to any combination of hardware and software in a specific form.

Certainly, the present invention can still have other various examples, and those skilled in the art can make various corresponding changes and transformations according to the present invention without departing from the spirit and essence of the present invention, and these corresponding changes and transformations should all belong to the protection scope of the appended claims of the present invention.

INDUSTRIAL APPLICABILITY

The current sharing method and device for the DC power supply provided by the present invention have no master machine and do not need to perform any processing on the fault of the master machine, which avoids a performance decline of the current sharing caused by the handover of the master machine and operations such as the master machine competition mechanism related to the master machine. In addition, the current sharing control only needs to acquire the bus current at any time, which greatly decreases the communication traffic when compared with the average current method, and will not increase the communication traffic with the increase of the number of parallel connections, making the number of parallel connections not limited by the communication. The current sharing method has both advantages of the low communication traffic of master-slave mode and the simple control of average mode, which reduces the difficulty of system development and improves the system reliability.

What is claim is:

1. A current sharing method for a DC (Direct Current) power supply, comprising:
   taking a latest detected bus current as a reference current to perform current sharing control on a local host current; and
   calculating and timing sending time of the local host current according to the latest detected bus current, the local host current, and a preset corresponding relationship between a difference between the local host current and the bus current and the sending time of the local host current, and if no new bus current is detected within a timing time, sending the local host current as a new bus current to a bus when the timing times out.

2. The method according to claim 1, wherein, the preset corresponding relationship between a difference between the local host current and the bus current and the sending time of the local host current is:

$$\begin{cases} I_e = I_{dc} - I_{bus} \\ T_s = T_r - I_e * K \end{cases}$$

wherein, $I_{dc}$ is the local host current, $I_{bus}$ is the bus current, $I_e$ is the difference between the local host current and the bus current, $T_r$ is a set time period, $T_s$ is the sending time of the local host current, and K is a time factor.

3. The method according to claim 2, wherein, timing the sending time of the local host current is:
   timing the calculated sending time of the local host current based on a synchronization clock.

4. The method according to claim 1, wherein, before the step of taking the latest detected bus current as the reference current to perform current sharing control on the local host current, the method further comprises:
   the local host current going through sampling processing, Analog-to-Digital (A/D) conversion processing and calibration processing.

5. The method according to claim 4, wherein, timing the sending time of the local host current is:
   timing the calculated sending time of the local host current based on a synchronization clock.

6. The method according to claim 1, wherein, timing the sending time of the local host current is:
   timing the calculated sending time of the local host current based on a synchronization clock.

7. A current sharing device for a DC (Direct Current) power supply, comprising a DC control module and a bus current management module, wherein:
   the DC control module is configured to: take a latest bus current detected by the bus current management module as a reference current to perform current sharing control on a local host current; and
   the bus current management module is configured to: detect the bus current and a local host current, and calculate and time sending time of the local host current according to the latest detected bus current, the local host current, and a preset corresponding relationship between a difference between the local host current and the bus current and the sending time of the local host current, and if no new bus current is detected within a timing time, send the local host current as a new bus current to a bus when the timing times out.

8. The current sharing device according to claim 7, wherein, the bus current management module comprises a signal processing unit, a current positioning unit, a timing sending control unit and a communication unit,
   the signal processing unit comprises a hardware sampling circuit and an Analog-to-Digital (A/D) conversion circuit, and is configured to perform sampling and A/D conversion processing on signals of DC voltage and DC current output by a local host;
   the current positioning unit is configured to: calculate the sending time of the local host current according to the bus current latest detected by the communication unit, the local host current latest detected by the signal processing unit, and the preset corresponding relationship between the difference between the local host current and the bus current and the sending time of the local host current;
   the timing sending control unit comprises a timer, and is configured to: time the sending time of the local host current calculated by the current positioning unit, and judge whether the bus current is received from the communication unit within the timing time of the timer, if a result of the judging is "yes", stop and reset the timer; if the result of the judging is "no", acquire the local host current from the current positioning unit and send the local host current to the communication unit when the timer times out;

the communication unit is configured to: acquire the bus current from a communication bus and then send the bus current to the current positioning unit and a DC control unit, and send the local host current sent from the timing sending control unit to the communication bus as the new bus current.

9. The current sharing device according to claim 8, wherein, the signal processing unit is further configured to: perform calibration processing on a voltage signal and a current signal obtained after the A/D conversion processing.

10. The current sharing device according to claim 8, wherein, the DC control module comprises a comparator and a rectifier output current control loop (PI), the comparator is configured to: take the bus current latest detected by the communication unit as the reference current to compare with the local host current latest detected by the signal processing unit;

the PI is configured to: perform error control according to a comparison result output by the comparator.

11. The current sharing device according to claim 8, wherein, the timing sending control unit is configured to: perform the timing based on a synchronization clock.

12. The current sharing device according to claim 8, wherein, the preset corresponding relationship between the difference between the local host current and the bus current and the sending time of the local host current is:

$$\begin{cases} I_e = I_{dc} - I_{bus} \\ T_s = T_r - I_e * K \end{cases}$$

wherein, $I_{dc}$ is the local host current, $I_{bus}$ is the bus current, $I_e$ is the difference between the local host current and the bus current, $T_r$ is a set time period, $T_s$ is the sending time of the local host current, and K is a time factor.

13. The current sharing device according to claim 7, wherein, the preset corresponding relationship between the difference between the local host current and the bus current and the sending time of the local host current is:

$$\begin{cases} I_e = I_{dc} - I_{bus} \\ T_s = T_r - I_e * K \end{cases}$$

wherein, $I_{dc}$ is the local host current, $I_{bus}$ is the bus current, $I_e$ is the difference between the local host current and the bus current, $T_r$ is a set time period, $T_s$ is the sending time of the local host current, and K is a time factor.

* * * * *